United States Patent
Genkin et al.

(10) Patent No.: US 9,896,743 B2
(45) Date of Patent: Feb. 20, 2018

(54) METHOD FOR RE-EXTRACTION OF RARE-EARTH METALS FROM ORGANIC SOLUTIONS AND PREPARING CONCENTRATE OF RARE-EARTH METALS

(71) Applicant: OPENED JOINT STOCK COMPANY "UNITED CHEMICAL COMPANY URALCHEM", Moscow (RU)

(72) Inventors: Mikhail Vladimirovich Genkin, Moscow (RU); Aleksey Vladimirovich Evtushenko, Moscow (RU); Aleksey Aleksandrovich Komkov, Moscow (RU); Alfiya Minerovna Safiulina, Moscow (RU); Vasiliy Sergeevich Spiridonov, Moscow (RU); Sergey Vladimirovich Shvetsov, Nizhegorodskaya Oblast (RU)

(73) Assignee: Opened Joint Stock Company "United Chemical Company Uralchem", Moscow (RU)

( * ) Notice: Subject to any disclaimer, the term of this patent is extended or adjusted under 35 U.S.C. 154(b) by 0 days.

(21) Appl. No.: 14/773,739

(22) PCT Filed: Nov. 8, 2013

(86) PCT No.: PCT/RU2013/000990
§ 371 (c)(1),
(2) Date: Sep. 8, 2015

(87) PCT Pub. No.: WO2014/137238
PCT Pub. Date: Sep. 12, 2014

(65) Prior Publication Data
US 2016/0024616 A1 Jan. 28, 2016

(30) Foreign Application Priority Data
Mar. 5, 2013 (RU) ................................ 2013109742

(51) Int. Cl.
*C22B 3/20* (2006.01)
*C22B 3/46* (2006.01)
*C22B 59/00* (2006.01)
*C22B 3/26* (2006.01)

(52) U.S. Cl.
CPC ............ *C22B 59/00* (2013.01); *C22B 3/0005* (2013.01); *C22B 3/20* (2013.01); *C22B 3/46* (2013.01); *Y02P 10/234* (2015.11)

(58) Field of Classification Search
CPC .............. C22B 59/00; C22B 3/46; C22B 3/20
See application file for complete search history.

(56) References Cited

U.S. PATENT DOCUMENTS

| | | | |
|---|---|---|---|
| 2,783,125 A | 2/1957 | De Rohden et al. | |
| 4,169,880 A | 10/1979 | Cuer et al. | |
| 5,030,424 A * | 7/1991 | Fulford | C01F 7/066 423/111 |

FOREIGN PATENT DOCUMENTS

| | | |
|---|---|---|
| CN | 101597688 A | 12/2009 |
| CN | 101823750 A | 9/2010 |
| EP | 0026132 A1 | 4/1981 |
| EP | 0026132 B1 | 8/1983 |
| EP | 0265547 A1 | 5/1988 |
| EP | 0522234 A1 | 1/1993 |
| KZ | 24267 A4 | 7/2011 |
| PL | 155815 | 6/1993 |
| RU | 2047562 C1 | 11/1995 |
| RU | 2118613 C1 | 9/1998 |
| RU | 2172719 C1 | 8/2001 |
| RU | 2225892 C1 | 3/2004 |
| RU | 2288171 C1 | 11/2006 |
| RU | 2293781 C1 | 2/2007 |
| RU | 2293134 C1 | 10/2007 |
| RU | 2349652 C2 | 3/2009 |
| RU | 2374260 C1 | 11/2009 |
| RU | 2471011 C1 | 12/2012 |
| RU | 2528573 C1 | 9/2014 |
| RU | 2528576 C1 | 9/2014 |
| RU | 2538863 C2 | 1/2015 |
| RU | 2543160 C2 | 2/2015 |
| RU | 2546739 C2 | 4/2015 |
| SU | 862819 A1 | 9/1981 |
| SU | 950684 A1 | 8/1982 |
| SU | 1370076 A1 | 1/1988 |
| WO | 2006058508 A1 | 6/2006 |

(Continued)

OTHER PUBLICATIONS

Sabot, Jean-Louis et al. EP 0026132 A1 published Apr. 1981. Machine translation of the description.*
International search report and written opinion of the international searching authority for co-pending PCT application No. PCT/RU2013/000990 dated May 15, 2014.
Decision to Grant a Patent for Invention dated Aug. 27, 2014 for RU Application No. 2013109742/02 filed Mar. 5, 2013, now RU Patent No. 2538863 C1.

(Continued)

*Primary Examiner* — George Wyszomierski
*Assistant Examiner* — Tima M McGuthry Banks
(74) *Attorney, Agent, or Firm* — Baker & McKenzie LLP

(57) ABSTRACT

The present invention relates to a method for recovery of rare earth metals (REM) from diluted aqueous acidic solutions comprising steps of liquid-phase extraction of REM into an organic phase and re-extraction of REM from the organic phase. The re-extraction is carried out by precipitation of REM as a solid phase in the form of a poorly soluble salt of a strong acid ($pK_a<0$). Recovery of REM into the concentrate is up to 99% in the course of one stage of the re-extraction.

4 Claims, No Drawings

(56) References Cited

FOREIGN PATENT DOCUMENTS

WO     WO 2013146472     * 10/2013

OTHER PUBLICATIONS

Office Action (w/English translation) Issued by the Department for Substantive Examination dated Apr. 2, 2014 for RU Application No. 2013109742/05, 7 pages.
Decision to Grant a Patent for Invention dated Aug. 27, 2014 for RU Application No. 2013109742/05 filed Mar. 5, 2013, now RU Patent No. 2538863 C1.
International Search Report and Written Opinion of the International Searching Authority for co-pending PCT application No. PCT/RU2013/000988 dated Mar. 13, 2014.
International Search Report and Written Opinion of the International Searching Authority for co-pending PCT application No. PCT/RU2013/000989 dated Apr. 3, 2014.
International Search Report and Written Opinion of the International Searching Authority for co-pending PCT application No. PCT/RU2013/000992 dated Apr. 10, 2014.
International Search Report and Written Opinion of the International Searching Authority for co-pending PCT application No. PCT/RU2013/000991 dated Apr. 10, 2014.
Office Action issued by the USPTO dated Jul. 1, 2016 for U.S. Appl. No. 14/773,716, 6 pages.
Office Action issued by the USPTO dated Jul. 11, 2016 for U.S. Appl. No. 14/773,725, 7 pages.
Koopman, Extraction of Lanthanides from the Phosphoric acid Production Process to gain a Purified Gypsum and a valuable Lanthanide by-product, Hydrometallurgy 58, 51-60 (Apr. 2000).
M. Benedict et al, "Nuclear Chemical Engineering", Second Edition, Section 8.6, McGraw-Hill, New York, 1981, 5 pages.
First Office Action with English translation, CN Application No. 201380076320.9, dated Aug. 17, 2016, 18 pages.

* cited by examiner

METHOD FOR RE-EXTRACTION OF RARE-EARTH METALS FROM ORGANIC SOLUTIONS AND PREPARING CONCENTRATE OF RARE-EARTH METALS

CROSS REFERENCE TO RELATED APPLICATIONS

This patent application is a national phase filing under section 371 of PCT/RU2013/000990, filed Nov. 8, 2013, which claims the priority of Russian patent application 2013109742, filed Mar. 5, 2013, each of which is incorporated herein by reference in its entirety.

FIELD OF THE INVENTION

The present invention relates to technologies for liquid extraction, in particular, preparing concentrate of rare-earth metals (REM) in nonferrous and ferrous metallurgy, in the course of treatment of waste of the chemical and metallurgical industries, as well as for purification of mine water and industrial wastewater.

BACKGROUND OF THE INVENTION

Liquid extraction processes are widely used for recovering and concentrating valuable components, in particular REM.

Isolation of REM concentrate from nitrate solutions using organic extractants based on neutral organophosphorous compounds (preferably tributylphospate—TBP) and isolation of REM concentrate from chloride solutions using organic extractants based on organophosphorous acids (preferably di-(2-ethylhexyl)phosphoric acid—DEHPA) is disclosed in the art (e.g. Chemistry and technology of rare and trace elements (rus). Part 2. Ed. Bolshakov K. A., Moscow, High School, 1976, p. 360; Slavetsky A. I. etc. Extraction of REM by DEHPA and TBP. Radiochemistry (rus), 1989, No. 1, p. 25-31; Stryapkov A. V., Salnikova E. V. Influence of amine nature on REM extraction by a mixture of amines and alkylphosphorous extractants. Vestnik OGU (rus), 2004, No. 5, p. 121-124).

The researchers pay considerable attention to the transfer of certain compounds from aqueous solutions into organic (extraction processes) and substantially less attention to the reverse processes (re-extraction processes).

A method for extracting rare-earth elements from phosphogypsum by treatment with nitric acid and subsequent extraction of rare earth elements (REE) by phosphine oxide is described in Martynova I.N. et al. Research of distribution of REE in the course of extraction from acidic nitrate-phosphate solutions. Collected articles "Processing and physico-chemical properties of compounds of rare elements. Apatity, 1984, pp. 6-8 (Rus). The disadvantage of this method is the need for expensive trialkyl phosphine oxide and the impossibility of complete liquid-phase removal of REE from the organic phase. Furthermore, because of the high loss of trialkyl phosphine oxide with the aqueous phase, this method is uneconomical and requires additional facilities for trialkyl phosphine oxide utilization.

A method for extracting rare metals from mixtures thereof using countercurrent re-extraction with a mineral acid solution, in particular distilled water acidified to a concentration of 0.05 mol/L with $HNO_3$ or acidified to a concentration of 1.0 mol/L with hydrochloric acid is described in RU patent 2049133. The disadvantage of this method is incomplete REM recovery and obtaining REM in form of a dilute solution of low concentration.

A method for processing phosphate rare earth concentrate comprising treatment of the concentrate by heating in the presence of an excess of oxalic acid to precipitate oxalates of REM is described in RU patent 2344079. However, this method is limited due to use of expensive oxalic acid.

Thus, REM re-extraction is usually carried out with concentrated acids, water (in particular, at an elevated temperature), carbonate or alkaline solutions. Liquid phase re-extraction with concentrated acids is suitable for processes with organic extracts having a high content of REM. If the REM concentration in the organic phase is low, as often happens at the extraction of the target component from dilute salt solutions having a high content of impurities, acid re-extraction allows solutions of low concentration up to 10 g/L of REM to be obtained.

Re-extraction with carbonate or alkaline solutions allows one to obtain a concentrated precipitate of REM, however it is associated with losses of acid passed into the organic solution during the REM extraction step, significant consumption of re-extractant, the appearance of large volumes of solutions of alkali metal salts or ammonium salts, with increased losses of the organic extractant due to its increased solubility in an aqueous phase. Water re-extraction possesses all these disadvantages, and re-extraction with oxalate solutions is limited due to the use of expensive oxalic acid.

SUMMARY

Embodiments of the present disclosure provide for methods for recovery of rare earth metals (REM) from diluted aqueous acidic solution. Methods may comprise liquid-phase extraction of REM into an organic phase and re-extraction of REM from the organic phase. The re-extraction may be carried out by precipitation of REM as a solid phase in the form of a poorly soluble salt of a strong acid ($pK_a<0$).

In some embodiments, the extractant used as the organic phase may be chosen from a group consisting of phosphine oxide in kerosene, tributylphosphate in kerosene, and di-(2-ethylhexyl)phosphoric acid (DEHPA). In some embodiments, the poorly soluble salt of REM may be REM sulphates. In some embodiments, the re-extraction of REM compounds may be carried out with sulphuric acid, a mixture of $H_2SO_4$ with HCl or $HNO_3$, a mixture of $M(HSO_4)_n$ with $H_2SO_4$ and HCl or $HNO_3$, where M is Na, K, Mg or REM atom. In some embodiments, about 30% to about 70% aqueous solution of sulphuric acid may be used for the re-extraction. In some embodiments, the ratio between organic phase and aqueous phase may be 500:1 to 1:2.

In some embodiments, the extractant after REM re-extraction may be washed with calcium salt solution, preferably with raffinate of REM extraction.

DETAILED DESCRIPTION

The goal of the present invention is developing a method for re-extraction of REM from organic solutions in the form of a solid phase concentrate without neutralization of the acid present in the organic phase by using commercially available cheap reagents. In the present invention, the term "REM" is used to indicate lanthanides and yttrium. Also, the symbol "Ln" is used for these elements.

Embodiments of the present disclosure advantageously provide for the use of strong mineral acid ($pK_a<0$), which forms a poorly soluble salt of REM, as an re-extractant. Use of sulphuric acid at concentration 30-70 wt. % is preferable.

Use of solutions of sodium sulphate, potassium sulphate, ammonium sulphate or magnesium sulphate in sulfuric, hydrochloric or nitric acid, as well as solutions of sulphates of lanthanides in these acids, is also possible. The process is described by the following equations, where M is Na or K:

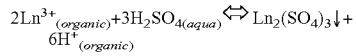

$2Ln^{3+}_{(organic)} + 3H_2SO_{4(aqua)} \Leftrightarrow Ln_2(SO_4)_3\downarrow + 6H^+_{(organic)}$

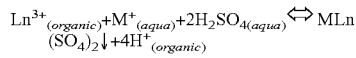

$Ln^{3+}_{(organic)} + M^+_{(aqua)} + 2H_2SO_{4(aqua)} \Leftrightarrow MLn(SO_4)_2\downarrow + 4H^+_{(organic)}$ The hydrogen cations present in the re-extractant have high activity and displace the REM atoms from the organic complex. Due to poor solubility in the aqueous phase, REM sulfates precipitate, thus shifting the equilibrium towards re-extraction.

The REM extraction is usually carried out from nitrate or chloride solution, therefore the organic phase contains the corresponding acid. Re-extraction of this acid by a cation mechanism does not occur due to the high activity of sulfuric acid in the aqueous re-extracting phase. Further, exchange of nitrate and chloride ions for sulfate ions between the organic and aqueous re-extracting phases also does not occur.

Thus, acid is not washed out from the organic extractant in the course of re-extraction by sulphuric acid, the process proceeds virtually without loss of acid in an organic extractant and REM precipitate to the solid phase at a concentration of 95% (in terms of the corresponding poorly soluble salt).

Phosphine oxide in kerosene, tributylphosphate in kerosene, di-(2-ethylhexyl)phosphoric acid (DEHPA) and other extractants known in the art can be used as an organic extractant for REM compounds.

The preferable ratio between organic and aqueous phase is 500:1 to 1:2. Recovery of REM into the concentrate according to the method of the present invention is up to 99% in the course of one stage of the re-extraction.

After re-extraction of lanthanides, the extractant may contain sulphuric acid, sulphate anions. If extraction of REM is carried out from calcium solutions, phase contact during the organic phase recycling leads to formation of precipitate, which can clog the extraction equipment (for example, box type mixer-settlers). Therefore, before the return to the extraction stage, the extractant is washed with calcium salt solution, and the formed precipitate is separated. A raffinate of REM extraction obtained after filtration of REM concentrate is preferably used for washing.

The present invention is explained in more detail below using exemplary embodiments, serving solely for illustrative purposes and not intended to limit the scope of the present invention defined by the appended claims.

EXAMPLE 1

100 volume parts of REM extract in undiluted tributyl phosphate (TBP) containing 1.5 g/L of $Ln_2O_3$ and 120 g/L of $HNO_3$ were treated with 10 parts of 60 wt. % sulphuric acid. The acid (aqueous) phase and precipitate were separated, the precipitate was washed with acetone until a neutral reaction was achieved and dried. The concentrate contained 45% $Ln_2O_3$ (78% $Ln_2(SO_4)_3$ in terms of sulphate). The acid contained 2.2 g/L of $Ln_2O_3$ and 0.2 g/L of nitrate anions.

The organic phase was treated again with 10 parts of 60 wt. % sulphuric acid. Precipitation was not observed, the content of REM in inorganic phase was <0.01 g/L. Thus, the complete re-extraction was carried out in the course of one stage.

The organic extractant was treated with 100 parts of a solution containing 60 g/L $HNO_3$ and 200 g/L $Ca(NO_3)_2$. When the aqueous and organic phases were brought into contact, copious white precipitate of calcium sulfate was formed. The phases were separated. The acid content in the organic extractant was 128 g/L, the acid content in aqueous solution was 64 g/L.

EXAMPLE 2

100 volume parts of REM extract in undiluted tributyl phosphate (TBP) containing 1.5 g/L of $Ln_2O_3$ and 120 g/L of $HNO_3$ were treated with 50 parts of solution containing 30 wt. % sulphuric acid and 13 wt. % $MgSO_4$. The aqueous phase and precipitate were separated, the precipitate was washed with acetone until a neutral reaction was achieved and dried. The concentrate contained 42% $Ln_2O_3$ (73% $Ln_2(SO_4)_3$ in terms of sulphate). The aqueous phase contained 3.2 g/L of $Ln_2O_3$ and 0.15 g/L of nitrate anions.

The organic phase was treated with 10 parts of 60 wt. % sulphuric acid. Precipitation was not observed, the content of REM in inorganic phase was <0.01 g/L. Thus, the complete re-extraction was carried out in the course of one stage.

The organic extractant was treated with 100 parts of a solution containing 60 g/L $HNO_3$ and 200 g/L $Ca(NO_3)_2$. When the aqueous and organic phases were brought into contact, copious white precipitate of calcium sulfate was formed. The phases were separated. The acid content in the organic extractant was 120 g/L, the acid content in aqueous solution was 61 g/L.

EXAMPLE 3

100 volume parts of REM extract in undiluted tributyl phosphate (TBP) containing 1.5 g/L of $Ln_2O_3$ and 120 g/L of $HNO_3$ were treated with 10 parts of solution containing 240 g/L $HNO_3$ and 300 g/L $K_2SO_4$. The aqueous phase and precipitate were separated, the precipitate was washed with acetone until a neutral reaction was achieved and dried. The concentrate contained 34.5% $Ln_2O_3$ (82% $KLn(SO_4)_2 \cdot H_2O$ in terms of sulphate). The aqueous phase contained 0.5 g/L of $Ln_2O_3$ and 232 g/L of $HNO_3$. The organic phase contained 123 g/L of $HNO_3$.

The organic phase was treated with 10 parts of 60 wt. % sulphuric acid. Precipitation was not observed, the content of REM in inorganic phase was <0.01 g/L. Thus, the complete re-extraction was carried out in the course of one stage.

EXAMPLE 4

200 volume parts of REM extract in 20% solution of trialkylphosphine oxide in de-aromatized kerosene containing 2.1 g/L of $Ln_2O_3$ and 30 g/L of $HNO_3$ were treated with 1 part of 45 wt. % $H_2SO_4$. The acid (aqueous) phase and precipitate were separated, the precipitate was washed with acetone until a neutral reaction was achieved and dried. The concentrate contained 57% $Ln_2O_3$ (98% $Ln_2(SO_4)_3$ in terms of sulphate). The acid phase contained 2.4 g/L of $Ln_2O_3$ and 0.1 g/L of nitrate anions.

The organic phase was treated with 10 parts of 45 wt. % sulphuric acid. Precipitation was not observed, the content of REM in inorganic phase was <0.01 g/L. Thus, the complete re-extraction was carried out in the course of one stage.

The organic extractant was treated with 100 parts of a solution containing 60 g/L $HNO_3$ and 200 g/L $Ca(NO_3)_2$. When the aqueous and organic phases were brought into contact, copious white precipitate of calcium sulfate was formed. The phases were separated. The acid content in the organic extractant was 30 g/L, the acid content in aqueous solution was 60 g/L.

EXAMPLE 5

500 volume parts of REM extract in 30% solution of di-(2-ethylhexyl)phosphoric acid in de-aromatized kerosene containing 2.1 g/L of $Ln_2O_3$ were treated with 1 part of 70 wt. % $H_2SO_4$. The acid (aqueous) phase and precipitate were separated, the precipitate was washed with acetone until a neutral reaction was achieved and dried. The concentrate contained 51% $Ln_2O_3$ (88.5% $Ln_2(SO_4)_3$ in terms of sulphate). The acid phase contained 3.5 g/L of $Ln_2O_3$.

The organic phase was treated with 10 parts of 70 wt. % sulphuric acid. Precipitation was not observed, the content of REM in inorganic phase was <0.01 g/L. Thus, the complete re-extraction was carried out in the course of one stage.

The organic extractant was treated with 100 parts of a solution containing 50 g/L $CaCl_2$. When the aqueous and organic phases were brought into contact, copious white precipitate of calcium sulfate was formed.

While the present invention is described in detail above, one skilled in the art will recognize that modifications and equivalent substitutions can be made, and such modifications and substitutions are within the scope of the present invention defined by the appended claims.

What is claimed:

1. A method for recovery of rare earth metals (REM) from diluted aqueous acidic solution comprising:
    liquid-phase extraction of REM into an organic phase and re-extraction of REM from the organic phase;
    wherein the re-extraction is carried out by precipitation of REM from the organic phase with 40 wt. % to 70 wt. % aqueous solution of sulphuric acid, a mixture of $H_2SO_4$ with HCl or $HNO_3$, or a mixture of $M(HSO_4)_n$ with $H_2SO_4$ and HCl or $HNO_3$, where M is Na, K, Mg or REM atom, as a solid phase in the form of REM sulphates, and
    wherein an extractant used as the organic phase is chosen from a group consisting of phosphine oxide in kerosene, tributylphosphate in kerosene, and di-(2-ethylhexyl)phosphoric acid (DEHPA).

2. The method of claim 1, wherein the volumetric ratio between organic phase and aqueous phase is 500:1 to 1:2.

3. The method of claim 1, wherein the extractant after REM re-extraction is washed with a calcium salt solution.

4. The method of claim 3, wherein the calcium salt solution is a raffinate of REM extraction.

* * * * *